US012698985B2

(12) United States Patent
Fontanet et al.

(10) Patent No.: US 12,698,985 B2
(45) Date of Patent: Aug. 4, 2026

(54) LINEAR INDUCTIVE SENSOR

(71) Applicant: Vitesco Technologies GmbH, Regensburg (DE)

(72) Inventors: Alain Fontanet, Muret (FR); Jérémie Blanc, St Jean (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 179 days.

(21) Appl. No.: 18/833,226

(22) PCT Filed: Mar. 3, 2023

(86) PCT No.: PCT/EP2023/055395
§ 371 (c)(1),
(2) Date: Jul. 25, 2024

(87) PCT Pub. No.: WO2023/169939
PCT Pub. Date: Sep. 14, 2023

(65) Prior Publication Data
US 2024/0418543 A1 Dec. 19, 2024

(30) Foreign Application Priority Data
Mar. 8, 2022 (FR) ...................................... 2202005

(51) Int. Cl.
G01D 5/20 (2006.01)

(52) U.S. Cl.
CPC ....... G01D 5/2053 (2013.01); *G01D 2205/18* (2021.05)

(58) Field of Classification Search
CPC .. G01D 5/12; G01D 5/14; G01D 5/20; G01D 5/2006; G01D 5/204; G01D 5/2053;
(Continued)

(56) References Cited

U.S. PATENT DOCUMENTS

2002/0043972 A1* 4/2002 Irle ........................ G01D 5/204
324/207.17
2014/0225600 A1 8/2014 Fontanet et al.
(Continued)

FOREIGN PATENT DOCUMENTS

DE 102020114014 A1 12/2021
FR 2999702 A1 6/2014
(Continued)

OTHER PUBLICATIONS

International Search Report (PCT/ISA/210) with English translation and Written Opinion (PCT/ISA/237) mailed on Jun. 15, 2023, by the European Patent Office as the International Searching Authority for International Application No. PCT/EP2023/055395, 16 pgs.

*Primary Examiner* — Huy Q Phan
*Assistant Examiner* — David B Frederiksen
(74) *Attorney, Agent, or Firm* — Buchanan Ingersoll & Rooney PC

(57) ABSTRACT

An inductive position sensor includes a primary winding, a first secondary winding, and a second secondary winding superimposed on the first secondary winding, wherein each turn comprises two turn segments referred to as transverse segments, each oriented substantially perpendicular to a longitudinal axis, and at least two segments referred to as longitudinal segments arranged each time between two transverse segments, and the transverse segments are irregularly distributed along the longitudinal axis. An area of the sensor having along the longitudinal axis a density of transverse segments substantially higher than the density of segments outside of the area.

11 Claims, 2 Drawing Sheets

(58) Field of Classification Search
    CPC .... G01D 5/22; G01D 5/2291; G01D 2205/18;
                                  G01B 7/30; G01B 7/31
    See application file for complete search history.

(56)                    References Cited

U.S. PATENT DOCUMENTS

| | | | | |
|---|---|---|---|---|
| 2020/0173812 | A1* | 6/2020 | Fontanet .............. | G01D 5/2291 |
| 2020/0271480 | A1* | 8/2020 | Shaga .................. | G01D 5/2073 |
| 2020/0400465 | A1 | 12/2020 | Fontanet | |
| 2021/0302206 | A1 | 9/2021 | Ferreira Da Cunha et al. | |

FOREIGN PATENT DOCUMENTS

| | | | |
|---|---|---|---|
| FR | 3002034 | A1 | 8/2014 |
| FR | 3068464 | A1 | 1/2019 |
| WO | 2020193344 | A1 | 10/2020 |
| WO | 2021239175 | A1 | 12/2021 |

* cited by examiner

LINEAR INDUCTIVE SENSOR

CROSS REFERENCE TO RELATED APPLICATIONS

This application is the U.S. National Phase Application of PCT International Application No. PCT/EP2023/055395, filed Mar. 3, 2023, which claims priority to French Patent Application No. FR2202005, filed Mar. 8, 2022, the contents of such applications being incorporated by reference herein.

The present invention relates to a linear inductive sensor.

Field of the Invention

The present disclosure relates to the field of contactless position measurement of a mechanical part. It can be used for a great many applications as it is often beneficial in industry to determine the position of a part, or any type of mechanical element, without making contact therewith.

BACKGROUND OF THE INVENTION

The present disclosure relates more particularly to an inductive sensor the operating principle of which is based on the variation in coupling between a primary winding and secondary windings of a transformer operating at high frequency and without the use of a magnetic circuit. The coupling between these windings varies as a function of the position of a moving (electrically) conducting part, generally called the "target". Specifically, currents induced in the target modify the voltages induced in the secondary windings. By adjusting the configuration of the windings and, where applicable, knowing the current injected into the primary winding, measurement of the voltage induced in the secondary windings allows the position of the target to be determined.

Such an inductive sensor may be incorporated into a device, in particular an electronic device, and it is known practice to produce the transformer mentioned above on a printed circuit board. The primary winding and the secondary windings then consist of tracks drawn on the printed circuit board. The primary winding is then for example supplied with power by an external source and the secondary windings are the site of voltages induced by the magnetic field created by a current flowing through the primary winding. The target, which is a conductive part, a metal part for example, may have a simple shape. It may for example be a part cut from a metal sheet. To produce a linear sensor, the cut-out used to produce the target is for example rectangular, whereas, to produce a rotary sensor, this cut-out will for example take the form of an angular sector of radius and angle tailored to the motion of the part.

Sensors of this type have the advantage of being simple and robust. They are very reliable owing in particular to the absence of contact between the sensor and the target the position of which is measured. They are for example used in the automotive industry to determine the transmission ratio engaged in a gearbox, notably an automatic gearbox, to detect the opening position of a valve, to determine the position of a rotor of an electric motor, etc.

Document FR-3 002 034, incorporated herein by reference, concerns an inductive position sensor of this type and includes:

a primary winding, and at least two secondary windings each made up of several turns made on two layers of a printed circuit board. A secondary winding has turns each with substantially the same shape, and aligned in what is referred to as a longitudinal direction with, each time, an offset between them.

In this position sensor:

each of the turns has a first generally concave portion arranged on one layer of the printed circuit board and a second generally concave portion arranged on the other layer of the printed circuit board, the first portion of a turn is connected to the second portion of the same turn by a first via passing through the printed circuit board, the first portion of a turn is connected to the second portion of a neighboring turn by a second via passing through the printed circuit board.

Such a sensor makes it possible to take accurate measurements over the entire travel of the part the position of which is to be determined.

In some applications, determination is desired with great accuracy over a (small) part of the travel of the target.

SUMMARY OF THE INVENTION

An aspect of the present disclosure provides a sensor making it possible to determine with great accuracy the position of a metal target.

An inductive position sensor is proposed, comprising:

a first secondary winding formed of several turns aligned along a longitudinal axis as a first part of turns and a second part of turns, the turns of the second part being arranged symmetrically with respect to the turns of the first part, a second secondary winding, superimposed on the first secondary winding and formed of several turns aligned along said longitudinal axis, said turns being distributed into three sets of turns, a first central set of turns arranged between two lateral sets of turns, the lateral sets of turns being arranged symmetrically to the central set of turns, and a primary winding, surrounding the first secondary winding and the second secondary winding, wherein each turn comprises two turn segments referred to as transverse segments, each oriented substantially perpendicular to the longitudinal axis, and at least two segments referred to as longitudinal segments arranged each time between two transverse segments.

According to the present disclosure, it is proposed herein that the transverse segments be irregularly distributed along the longitudinal axis, an area of the sensor having along the longitudinal axis a density of transverse segments substantially higher than the density of segments outside of said area.

When a metal target passes in front of the area in which the density of transverse segments, in other words the number of transverse segments per unit length, is higher, a finer measurement of the position of the target can be taken because a greater number of turns participates in determining the position of the target.

The features set out in the following paragraphs can optionally be implemented independently of one another or in combination with one another:

in said area, the density of transverse segments corresponds to at least twice the density of segments outside of said area; and/or the length of the area measured along the longitudinal axis is between a quarter and a third of the overall length of the secondary windings along said longitudinal axis; and/or half of the transverse segments of the secondary windings are located in said area; and/or said area with a high density of transverse segments is arranged in a central position in said sensor; and/or in the first secondary winding, each turn comprises a transverse segment close to the center of the sensor and a transverse segment distant from the center of the sensor, and each transverse segment close to the center of the sensor is superimposed with a transverse segment of the second secondary winding; and/or each turn has a generally hexagonal shape; and/or a respective surface area delimited by each turn of the first secondary winding increases with the distance between said turn and the center of the sensor; and/or the first part of the turns of the first secondary winding is wound in a first direction and the second part of the turns of the first secondary winding is wound in a second direction opposite to the first direction; and/or the turns of the lateral sets of the second secondary winding are wound in the opposite direction to the direction of winding of the turns of the central set of the second secondary winding; and/or the inductive position sensor is produced on a printed circuit board and in this case, advantageously, each turn has a part of a turn made on a first face of the printed circuit while another part of the same turn is made on a second face of the printed circuit, parallel to said first face, said parts of turns being connected to one another by vias made in the printed circuit board.

BRIEF DESCRIPTION OF THE DRAWINGS

Further features, details and advantages will become apparent on reading the following detailed description, and on studying the appended drawings, in which.

DESCRIPTION OF THE EXEMPLARY EMBODIMENTS

Figure 1:
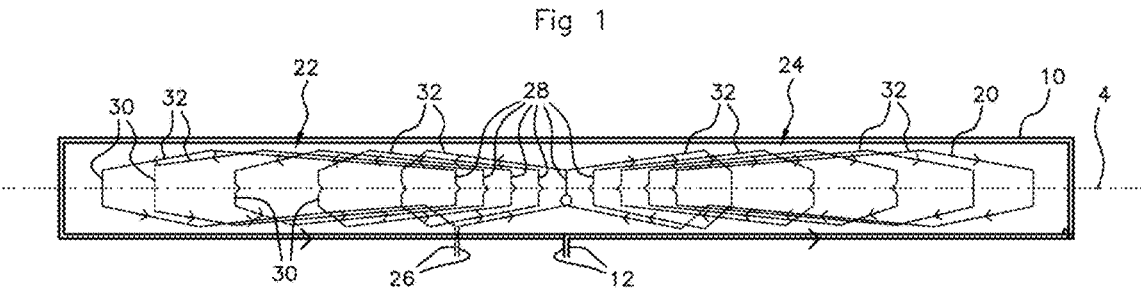
FIG. 1 shows, in top view, an example of a primary winding and a first secondary winding, in a sensor according to an aspect of the invention.
Figure 2:
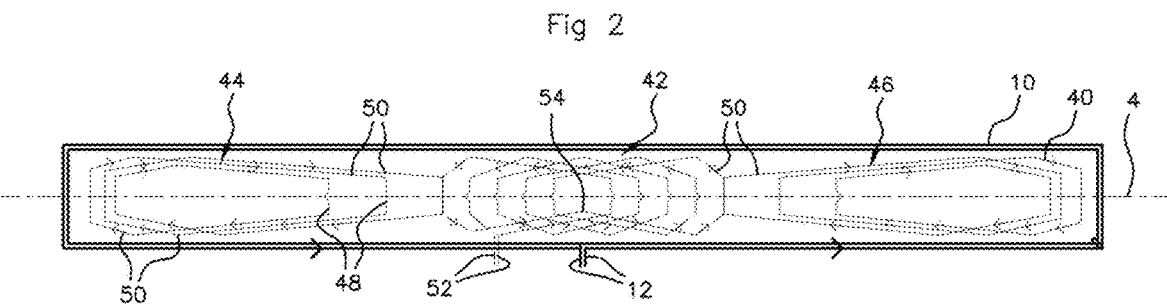
FIG. 2 shows, in top view, the primary winding of FIG. 1 with a second secondary winding, in said sensor according to an aspect of the invention.
Figure 3:
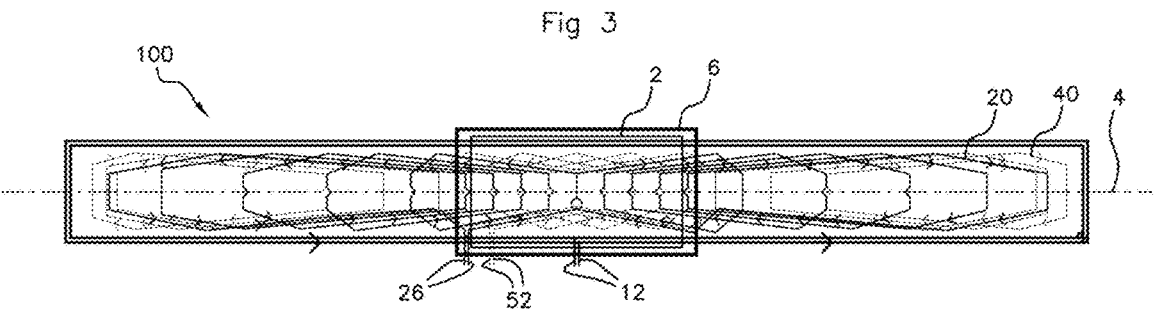
FIG. 3 shows, in top view, said sensor according to an aspect of the invention, comprising the primary winding of FIGS. 1 and 2 with the first secondary winding of FIG. 1 and the second secondary winding of FIG. 2.
Figure 4:
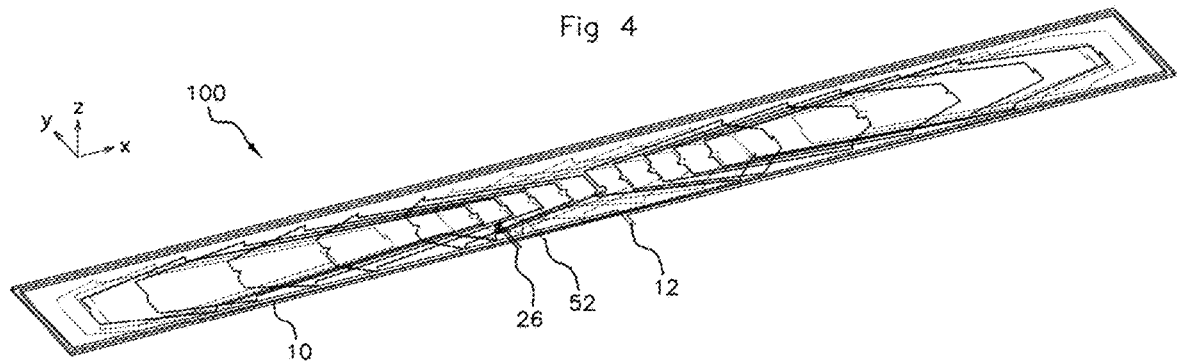
FIG. 4 shows the sensor of FIG. 3 in perspective.
Figure 5:
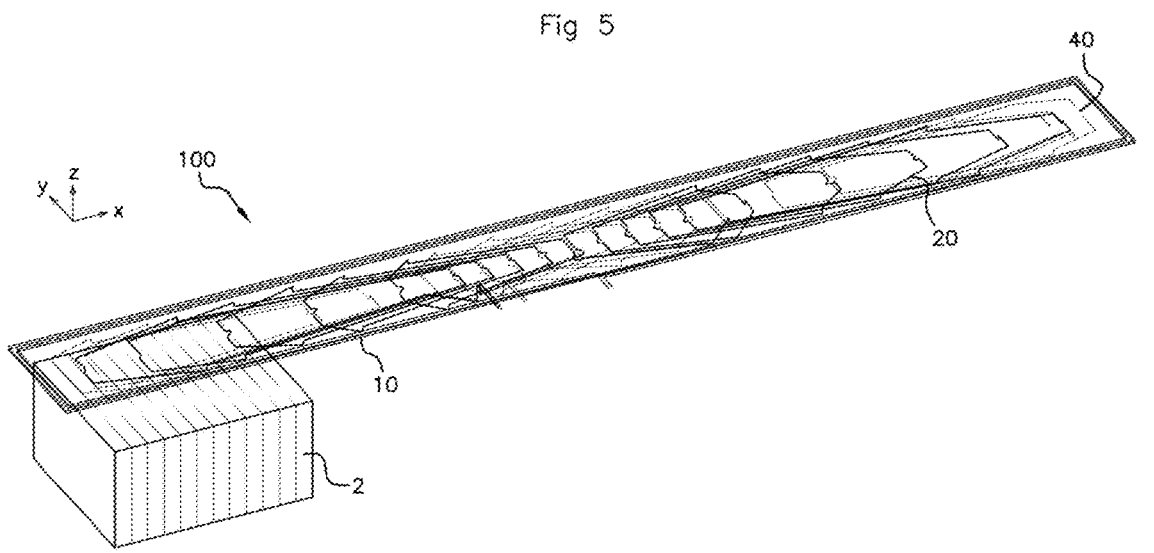
FIG. 5 shows, in perspective, the sensor of FIG. 4 associated with a target.

FIGS. 3 to 5 schematically depict a linear inductive sensor 100 making it possible to determine the relative position of a target 2 (see FIGS. 3 and 5) with respect to said sensor. This type of sensor is already known to those skilled in the art. Document FR3002034 discloses a type of inductive position sensor to which the present disclosure may apply. This disclosure may, however, also apply to other inductive sensors operating on the same principle, that is to say operating like a coreless electrical transformer, with in this case a primary transmitter winding and (two) secondary receiver windings. FIG. 1 shows the primary transmitter winding 10 with a first secondary winding 20 while FIG. 2 shows the primary winding 10 with a second secondary winding 40.

Reference is now made to FIG. 1. As stated, this figure shows the primary transmitter winding 10. This winding may be produced, for example, on a printed circuit board (also known as a PCB). It is located, for example, on the periphery of at least one face of this board, for example on each of the faces of this board. For example, as shown in FIGS. 1 and 2, provision may be made for two respective turns on each face of a printed circuit board (i.e. four turns in total). Each turn shown here has a rectangular shape, the largest dimension of which extends parallel to a longitudinal axis 4. The longitudinal axis 4 corresponds to an axis of symmetry of each turn, which is parallel to the long sides of the turn in question. This longitudinal axis 4 corresponds to the axis along which the position of the target 2 is measured.

The first secondary winding 20 shown in FIG. 1 has turns aligned along the longitudinal axis 4. These turns are divided into two parts: a first part 22 of the turns (on the left in FIG. 1) corresponds to turns wound in a first direction and a second part 24 corresponds to turns wound in a direction opposite to the first direction. Arrows in FIG. 1 indicate the direction of winding of the turns. This direction corresponds to the direction of flow of a current (theoretical, as no current flows in the secondary windings, in use) in the turns: if the current flows counterclockwise in the turns of the first part 22, it flows clockwise in the turns of the second part 24. Thus, starting from a point located at the center of the sensor and following the line of the turns moving away from the center of the sensor, the turns turn in a first direction over the first part 22 of the turns, and in the opposite direction over the second part of the turns 24.

Each of the two windings shown in FIG. 1 has connection tracks. Thus, the primary winding 10 has two power supply tracks 12 while the first secondary winding 20 has two connection tracks 26 for measuring a voltage induced in the secondary winding 20.

Each turn of the first secondary winding 20 comprises a first transverse segment 28 which extends substantially perpendicular to the longitudinal axis 4, in a plane parallel to the plane (OXY)—corresponding to the plane of FIGS. 1 to 3—of the primary winding 10 and secondary windings, and a second transverse segment 30 which is also substantially perpendicular to the longitudinal axis 4 (which is in this case parallel to the axis X). The first transverse segment 28 corresponds to the transverse segment of a turn closest to the center of the sensor. A transverse segment extends along a substantially transverse line (substantially parallel to the axis Y) which may be made up of several portions, for example a portion on one face of the printed circuit and another portion on another face of the printed circuit. The transverse segments (28 and 30) are shown rectilinear in the figures in the preferred embodiment illustrated. However, these segments could be curved, S-shaped or made up of two segments inclined with respect to one another (as illustrated by the longitudinal segments described below). For example, a segment will be considered to be substantially perpendicular to the longitudinal axis if this segment, or its tangent, forms (at any point) an angle of 90°+/−10° with the longitudinal axis 4, or preferably 90°+/−5°, or even 90°+/−1°.

A longitudinal segment 32 connects the first transverse segment 28 to the second transverse segment 30 while another longitudinal segment 32 connects said second transverse segment 30 to the first transverse segment 30 of a subsequent turn. In the embodiment illustrated, each turn is substantially hexagonal (the hexagon is not closed because the turns are offset from one another but the overall shape of a turn has six sides). Thus, the longitudinal segments 32 are each in the form of two segments forming an obtuse, almost flat angle between them (for example between 135 and 170°). Other shapes (curved, S-shaped or the like) may also be considered here.

A first respective transverse segment 28 is located at the center of the position sensor, for the first part 22 of turns and for the second part 24 of turns. In top view, these two first transverse segments 28 are superimposed because they are produced on both faces of the printed circuit board. Note that, in this case, the first part 22 of turns is symmetrical in top view to the second part 24 of turns, with respect to the plane containing these first transverse segments 28. This superposition is a non-essential advantageous feature. It makes it easier to produce the windings and optimizes the cost price of the sensor.

The transverse segments are distributed along the longitudinal axis 4, but irregularly. At least some of the first transverse segments 28 are concentrated in an area at the center of the sensor while the other transverse segments are arranged along the longitudinal axis 4, being further spaced apart from one another. Thus, the surface area of the turns increases moving away from the center of the sensor. An average density DM of the transverse segments may be determined, corresponding to the number of transverse segments (first and second) divided by the total length of the secondary windings along the longitudinal axis 4. Note that at the center, the density of the transverse segments (number of transverse segments divided by the length of the area in question) is greater than the density of the transverse segments at the ends of the sensor. It can be considered that the density of the transverse segments in an area at the center of the sensor is for example greater than 1.33 times DM, preferably greater than 1.5 times DM and even more preferably greater than 1.8 times DM. In general, for example, a central area may be provided with a density of transverse segments of between 1.33*DM and 3*DM, preferably between 1.5*DM and 2.5*DM.

In the preferred embodiment illustrated in the figures, all of the first transverse segments 28 are grouped together at the center of the sensor in a central area 6 (FIG. 3). This area is for example centered exactly on a midpoint of the secondary windings along the longitudinal axis 4. These first transverse segments 28 are regularly distributed but, while they represent half of the transverse segments, they are located at the center of the sensor over only a small part of the length of the sensor, the length of which is less than half the length of the sensor, for example less than a third of the length of the sensor, indeed for example around a quarter of the length of the sensor. The length of the sensor may be considered in this case to be the length along which the secondary windings extend, measured along the longitudinal axis 4. This length corresponds to the length of travel that can be measured by the sensor.

In the embodiment shown, there are N first transverse segments 28 and N second transverse segments 30. If L is the length of the sensor, the linear distribution density of the transverse segments at the center of the sensor will then be N/(L/4), or 4N/L. This value corresponds to twice DM (DM=2N/L).

The other transverse segments are distributed over the rest of the length of the sensor. The linear distribution density of the transverse segments outside of the central area 6 of the sensor will then, in this example, be N/(3L/4), that is to say 4N/3L. This distribution density is therefore three times lower than in the central part of the sensor. Note in particular in FIG. 1 that the second transverse segments 30 are substantially distributed regularly on either side of the central area 6 of the sensor comprising the first transverse segments 28. In variants, the linear distribution density of the transverse segments may be more than three times higher in the central area 6 of the sensor than outside of this area (within the limits of what is technologically feasible in terms of density on the printed circuit).

FIG. 2 shows, in top view, the second secondary winding 40. This second winding has turns aligned along the longitudinal axis 4. These turns are distributed into three sets of turns, a first central set 42 of turns, a second lateral set 44 of turns and a third lateral set 46 of turns. The first set 42 of turns is substantially symmetrical with respect to a plane parallel to the longitudinal axis 4, and the second set 44 and the third set 46 are substantially symmetrical with respect to this same plane (except for a few details in each case for these two symmetries). Furthermore, the first, second and third sets 42, 44, 46 are substantially symmetrical, in planar symmetry relative to a plane perpendicular to the longitudinal axis 4 and passing through the center of the sensor.

There are also, for each turn of the second secondary winding 40, turns with two transverse segments 48 and lateral segments 50. As with the first secondary winding 20, the preferred shape of the turns corresponds to a hexagon (open due to an offset between the turns). For these two secondary windings, it may for example be provided that the orthogonal projection of a turn considered in a plane parallel to the plane OXY of the sensor (corresponding to the faces of the printed circuit) is inscribed within a hexagon—non-regular—with a rate of coverage greater than or equal to 90% between said projection and the hexagon.

The three sets of turns are formed by a single wire the two ends of which are constituted by two connection tracks 52 intended to be connected to means making it possible to measure a voltage induced in the second secondary winding 40.

For each set of turns, the turns are offset from one another along the longitudinal axis 4. In top view, there are in each case between two sets of turns (i.e. between the first set and the second set on one side and between the first set and the third set on the other side) two superimposed transverse segments 48. Note also that there is, in the first set of turns, a connection 54 (electrical) between the second set and the third set. When a current is flowing in the wire forming the three sets of turns, note (see arrows in FIG. 2) that this current turns in a first direction (in this case clockwise) in the second set of turns, in the direction opposite to the first direction (that is to say counterclockwise) in the first set of turns 42 and again in the first direction in the third set 46 of turns.

As shown in FIGS. 3 to 5, in the sensor according to an aspect of the invention, the first secondary winding 20 and the second secondary winding 40 are superimposed. As those skilled in the art know, the wire forming the turns of one winding does not intersect and does not come into contact with the wire forming the other winding. It is proposed herein (FIGS. 4 and 5) to produce the turns alternately on the two faces of a printed circuit board as explained in document FR3002034. Vias are provided to pass the wires forming the two secondary windings alternately from one face to the other of the printed circuit board on which the sensor is produced. The vias are in this case preferably produced on the longitudinal axis 4 but could also be produced in other locations, as for example proposed in document FR3002034 at the junction between two sections of a lateral segment. In another embodiment, the vias are produced partly on the longitudinal axis 4 and partly, as for example proposed in document FR3002034, at the junction between two sections of a lateral segment. The secondary windings may include small via bypass areas, connecting two aligned rectilinear portions.

In the sensor shown here, in which the two secondary windings are superimposed, and more particularly in the central area 6 in which the density of transverse segments of the first secondary winding 20 is higher, it is provided that, apart from the two first transverse segments 28 at the center of the sensor, a transverse segment 48 of the second secondary winding 40 is superimposed (in top view, that is to say FIG. 3) on a first transverse segment 28 of the first secondary winding 20.

Note, in FIG. 3 for example, that the number of turns of the first secondary winding 20 corresponds to the number of turns of the second secondary winding 40. Note also that, taking into account the superpositions of transverse segments mentioned between the first secondary winding 20 and the second secondary winding 40, the transverse segments 48 of the second secondary winding 40 are therefore also distributed irregularly in the sensor. In the central area 6 of the sensor, there is thus overall a higher density of transverse segments.

Outside of the central area 6, there is not necessarily any superposition between a transverse segment 48 of the second secondary winding 40 and a first transverse segment 28 of the first secondary winding 20. Furthermore, the transverse segments 48 of the second secondary winding 40 are distributed regularly in the central area 6, and irregularly outside of said central area.

As regards the operation of the sensor, refer to document FR3002034A1 which discusses a number of physical principles concerning such a sensor (pages 5-6 and 8). When the target 2 (drawn in thin line in FIG. 3) moves along the first secondary winding 20, along the longitudinal axis 4, the voltage induced at the terminals (connection tracks 26) of the first secondary winding 20 corresponds substantially to a sinusoidal function. When the target 2 moves along the second secondary winding 40, along the longitudinal axis 4, the voltage induced at the terminals (connection tracks 52) of the second secondary winding 40 corresponds substantially to a cosine function. By dividing the signal measured across the terminals of the first secondary winding 20 by that measured across the terminals of the second secondary winding 40, a tangent function is thus obtained. To then ascertain the position of the target 2, the arctangent function is used.

The sensor configuration shown in the drawing makes it possible to ascertain with great accuracy the position of the target 2 when it is located in the central area 6. This configuration in this case makes it possible to locate the target 2 and to ascertain its position over the entire travel corresponding to the sensor. For this type of sensor, it is known practice to have a target the length (measured along the longitudinal axis 4) of which corresponds either to half or to a quarter of the maximum travel of the target (nominal travel of the sensor). In the example shown, the target 2 has a length corresponding to a quarter of the nominal travel of the sensor. This sensor makes it possible to determine with great accuracy the position of the target when it is located substantially opposite the center of the sensor over a travel of +/−x mm. In such a case, the length of the central area 6 (measured along the longitudinal axis 4) corresponding to the length of the target (measured along said axis) increased by 2*x. Advantageously, x is between 1 mm and 10 mm, more preferably between 2 mm and 5 mm, for example equal to 2.5 mm.

Industrial Application

The solution proposed above makes it possible to take position measurements with a single sensor while guaranteeing high measurement accuracy over a reduced range of total nominal travel. This sensor uses contactless technology and comprises a primary winding surrounding two superimposed secondary windings. It makes it possible to determine the position of a metal target moving along the secondary windings along an axis referred to as the longitudinal axis.

The solution is described in relation to a linear sensor, the longitudinal axis being rectilinear. It could also be applied to take a measurement on a circular sector. The longitudinal axis then corresponds to an arc of a circle.

The description set out above considers a "PCB" or single-layer printed circuit, with two opposite large faces parallel to one another. An aspect of the invention may also be implemented on a multilayer printed circuit. The turns may then extend on the two opposite large faces of the printed circuit and/or on metal interlayers.

In the sensor according to an aspect of the invention, each secondary winding comprises turns offset along the longitudinal axis. Each turn has segments extending substantially perpendicular to the longitudinal axis. These segments, referred to above as transverse segments, are important herein. These transverse segments are irregularly distributed on the longitudinal axis and there is a greater density (number of segments per unit length) of these transverse segments in a predetermined area, for example a central area of the sensor, in which a measurement must be taken with greater accuracy. This greater density of transverse segments concerns the two secondary windings. Logically, outside of this area, the density of the transverse segments will be lower. This will still make it possible to detect the presence of the target over the entire nominal travel of the target and to ascertain its position but with lower accuracy.

The present disclosure is not limited to the exemplary embodiment described above (which is described solely by way of example), or to the variants envisaged, but encompasses all variants that may be envisaged by those skilled in the art in the context of the protection sought. Thus for example, in certain cases, a third secondary winding could be envisaged to have more information on the target.

The invention claimed is:

1. An inductive position sensor comprising:

a first secondary winding formed of several turns aligned along a longitudinal axis as a first part of turns and a second part of turns, the turns of the second part being arranged symmetrically with respect to the turns of the first part, and each turn of the first secondary winding comprising a first transverse segment and a second transverse segment, the first transverse segment being closer to the center of the sensor than the second transverse segment, a second secondary winding, superimposed on the first secondary winding and formed of several turns aligned along said longitudinal axis, said turns being distributed into three sets of turns, a first central set of turns arranged between two lateral sets of turns, the lateral sets of turns being arranged symmetrically to the central set of turns, and a primary winding, surrounding the first secondary winding and the second secondary winding, wherein each turn comprises two turn segments referred to as transverse segments, each oriented substantially perpendicular to the longitudinal axis, and at least two segments referred to as longitudinal segments arranged each time between two transverse segments, wherein the first transverse segments-of the first secondary winding are regularly distributed, while the transverse segments of each of the first and second secondary windings are irregularly distributed along the longitudinal axis, an area of the sensor having along the longitudinal axis a density of transverse segments substantially higher than the density of segments outside of said area.

2. The inductive position sensor as claimed in claim 1, wherein in said area, the density of transverse segments-corresponds to at least twice the density of segments outside of said area.

3. The inductive position sensor as claimed in claim 2, wherein the length of the area measured along the longitudinal axis is between a quarter and a third of the overall length of the secondary windings along said longitudinal axis.

4. The inductive position sensor as claimed in claim 1, wherein the length of the area measured along the longitudinal axis is between a quarter and a third of the overall length of the secondary windings along said longitudinal axis.

5. The inductive position sensor as claimed in claim 1, wherein half of the transverse segments of the secondary windings are located in said area.

6. The inductive position sensor as claimed in claim 1, wherein said area with a high density of transverse segments is arranged in a central position in said sensor.

7. The inductive position sensor as claimed in claim 1, wherein in the first secondary winding, each first transverse segment close to the center of the sensor is superimposed with a transverse segment of the second secondary winding.

8. The inductive position sensor as claimed in claim 1, wherein each turn has a generally hexagonal shape.

9. The inductive position sensor as claimed in claim 1, wherein a respective surface area delimited by each turn of the first secondary winding-increases with the distance between said turn and the center of the sensor.

10. The inductive position sensor as claimed in claim 1, wherein the sensor is produced on a printed circuit board.

11. The inductive position sensor as claimed in claim 10, wherein each turn has a part of a turn made on a first face of the printed circuit while another part of the same turn is made on a second face of the printed circuit, parallel to said first face, said parts of turns being connected to one another by vias passing through the printed circuit board.

* * * * *